US008718172B2

(12) United States Patent
Hart et al.

(10) Patent No.: US 8,718,172 B2
(45) Date of Patent: May 6, 2014

(54) TWO STAGE PRECODING FOR MULTI-USER MIMO SYSTEMS

(75) Inventors: Brian Donald Hart, Sunnyvale, CA (US); Genyuan Wang, Plano, TX (US); Ahmadreza Hedayat, Allen, TX (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/459,328

(22) Filed: Apr. 30, 2012

(65) Prior Publication Data

US 2013/0287131 A1    Oct. 31, 2013

(51) Int. Cl.
*H04B 7/02* (2006.01)
*H04L 1/02* (2006.01)

(52) U.S. Cl.
USPC .......................................................... 375/267

(58) Field of Classification Search
USPC .......................................... 375/267; 455/132
See application file for complete search history.

(56) References Cited

U.S. PATENT DOCUMENTS

| 8,477,872 | B2 | 7/2013 | Zhang et al. |
| 8,493,836 | B2 | 7/2013 | Lee et al. |
| 8,582,672 | B2 | 11/2013 | Sanayei |
| 2009/0232191 | A1 | 9/2009 | Gupta et al. |
| 2009/0232507 | A1 | 9/2009 | Gupta et al. |
| 2009/0232510 | A1 | 9/2009 | Gupta et al. |
| 2010/0039928 | A1 | 2/2010 | Noh et al. |
| 2011/0003608 | A1* | 1/2011 | Forenza et al. ............... 455/501 |
| 2011/0194504 | A1 | 8/2011 | Gorokhov et al. |
| 2011/0249712 | A1 | 10/2011 | Hammarwall et al. |
| 2012/0002743 | A1 | 1/2012 | Cavalcante et al. |
| 2012/0202431 | A1 | 8/2012 | Hawryluck et al. |
| 2012/0328039 | A1 | 12/2012 | Mazzarese et al. |
| 2012/0328301 | A1 | 12/2012 | Gupta et al. |
| 2013/0004180 | A1 | 1/2013 | Gupta et al. |
| 2013/0201912 | A1 | 8/2013 | Sheng et al. |

OTHER PUBLICATIONS

Stankovic, et al., "Generalized Design of Multi-User MIMO Precoding Matrices," IEEE Transactions on Wireless Communications, vol. 7, No. 3, Mar. 2008.
Karaa, et al., "Linear Precoding for Multiuser MIMO-OFDM Systems," Communications, 2007, ICC '07, IEEE International Conference, Jun. 2007.

* cited by examiner

*Primary Examiner* — Chieh M Fan
*Assistant Examiner* — Tanmay Shah
(74) *Attorney, Agent, or Firm* — Edell, Shapiro & Finnan, LLC (57) ABSTRACT

Techniques are provided for generating a precoding matrix for a multi-user multiple-input multiple-output wireless communication system. A first wireless communication device is provided that has a plurality of antennas from which multiple spatial streams are to be simultaneously transmitted to a plurality of second wireless communication devices. A channel matrix is computed between the antennas of the first device and the antennas of each of the second wireless communication devices to produce a plurality of client-specific channel matrices. A singular value decomposition is computed of each client-specific channel matrices. A number of strongest singular values and their corresponding singular vectors are stored from the singular decomposition of each of the client-specific channel matrices. From each client-specific channel matrix, a principal component-like single-client channel matrix is computed. The principal component-like single-client channel matrices are combined to form a principal component-like multi-user channel matrix, from which the precoding matrix is computed.

25 Claims, 10 Drawing Sheets

TWO STAGE PRECODING FOR MULTI-USER MIMO SYSTEMS

TECHNICAL FIELD

The present disclosure relates to multi-user multiple-input multiple-output wireless communication systems.

BACKGROUND

A relatively recent development in wireless communications involves one wireless communication device transmitting, at the same time on the same bandwidth, to multiple spatially separated destination wireless communication devices. Each destination wireless device receives one or more space-time streams (STSs). This is known as downlink multi-user multiple-input multiple-output (DL-MU-MIMO) communications, i.e. simultaneous transmissions from one device to many devices, such as one wireless access point (AP) to many wireless clients. MU-MIMO techniques are part of the IEEE 802.11ac wireless network communication standard. The multi-user nature is different from a single destination device receiving all of the spatial streams, according to the IEEE 802.11n standard, for example.

The transmitting wireless device, e.g., an AP, "precodes" the transmit signal streams in order to achieve certain objectives. Each destination device typically has fewer antennas and/or receive chains than the total number of space-time streams. Consequently, the destination device cannot perform conventional MIMO equalization on all the space-time streams and then pick out the destination device's own stream. Rather, the AP needs to suppress the space-time streams not intended for a particular destination device at the non-intended devices. This processing of the transmit signal streams is referred to as precoding. If the destination device has more antennas and/or receive chains than the space-time streams intended for it, then the destination device can use its additional antenna and receiver resources for "interference suppression" with respect to the space-time streams not intended for that destination device. When the transmitting device performs precoding, the destination device can improve upon the precoding through the use of interference suppression. In the atypical case, the destination device may have more antennas and/or receive chains than the total number of space-time streams, and the destination device can therefore perform conventional MIMO receive processing (equalization) and "pick out" its space-time stream(s). This is known as "interference cancellation."

Interference suppression and cancellation can be improved if the transmitting device (e.g., the AP) sends training patterns for all space-time streams to all destination devices. The precoding operation attempts to achieve both (a) good signal strength of a space-time stream at the intended destination device ("beamforming"), and (b) near-zero signal of a space-time stream at a device that is not the intended recipient or destination device of that space-time stream ("null steering"). If both of these objectives are achieved, the signal-to-interference plus noise ratio (SINR) at the destination device can be improved. This is the overall objective of precoding: Obtain good SINR at each destination device so that each destination device can MIMO equalize (with interference suppression/cancellation as available) the signal and successfully recover the destination device's own space-time stream(s).

However, maximizing SINR is a complicated, nonlinear, iterative process. Zero Forcing and Minimum Mean Squared Error are known precoding methods, but are not readily suited to the case of an AP sending multiple space-time streams to a recipient when the number of space-time streams is less than the number of the destination device antennas and/or receive chains. Both Zero Forcing and Minimum Mean Squared Error involve selecting a subset of recipient antennas to target (where the subset has cardinality and is equal to the number of space-time streams destined for the recipient), and ignoring the remaining antennas of the destination device.

DESCRIPTION OF EXAMPLE EMBODIMENTS

Overview

Techniques are provided for generating a precoding matrix for a multi-user multiple-input multiple-output wireless communication system. A first wireless communication device is provided that has a plurality of antennas from which multiple spatial streams are to be simultaneously transmitted to a plurality of second wireless communication devices each having a plurality of antennas. The first wireless communication device computes a channel matrix between the plurality of antennas of the first wireless communication device and the plurality of antennas of each of the second wireless communication devices to produce a plurality of client-specific channel matrices. A singular value decomposition is computed of each of the client-specific channel matrices. A number of strongest singular values and their corresponding singular vectors are stored from the singular decomposition of each of the client-specific channel matrices. From each client-specific channel matrix, a principal component-like single-client channel matrix is computed based on the number of strongest singular values stored. The principal component-like single-client channel matrices are combined to form a principal component-like multi-user channel matrix. The precoding matrix is computed from the principal component-like multi-user channel matrix. The precoding matrix is applied to the multiple spatial streams to be simultaneously transmitted across the plurality of antennas of the first wireless communication device.

Example Embodiments

Figure 1:
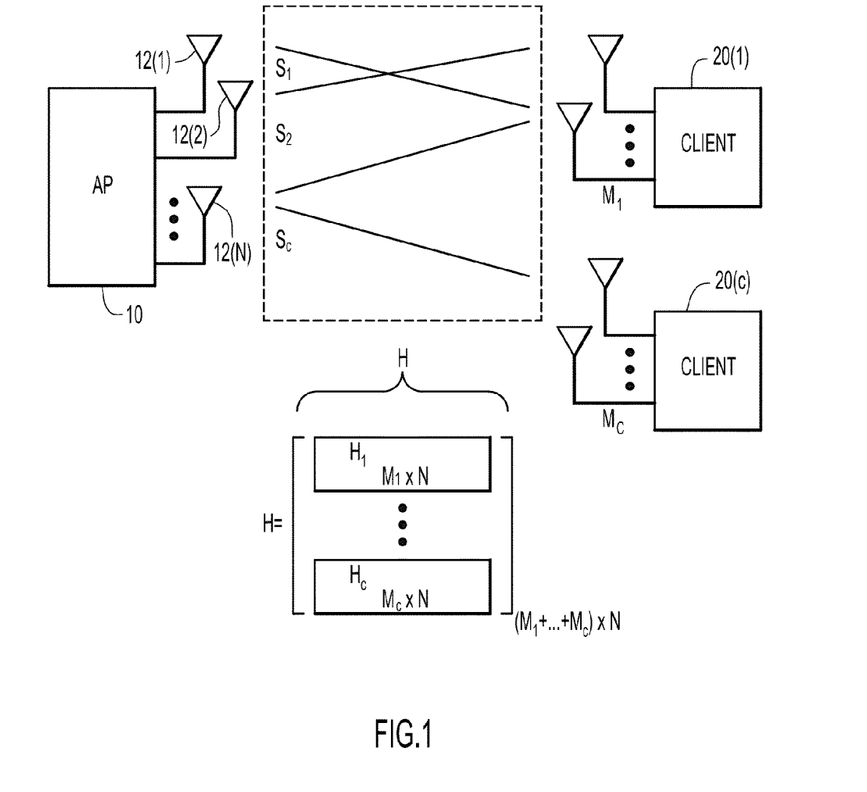
FIG. 1 is a diagram of a wireless communication system in which a first wireless communication device performs multi-user transmissions to a plurality of second wireless communication devices according to the techniques described herein.

Referring first to FIG. 1, a block diagram is shown of a communication system comprising a first wireless communication device 10, e.g., a wireless access point (AP), and a plurality of second wireless communication devices, e.g., wireless clients (clients) 20(1)-20(c). The AP 10 has N transmit (Tx) antennas 12(1)-12(N). Clients 20(1)-20(c) have $M_1, M_2, \ldots, M_c$ receive (Rx) antennas, respectively. According to multi-user multiple-input multiple-output (MU-MIMO) techniques, the AP simultaneously sends $S_1, S_2 \ldots S_c$ spatial streams to clients 20(1)-20(c), respectively. The single-client channel matrix $H_i$ is size $M_i*N$. The all-user channel matrix H is size $(M_1+M_2+\ldots M_c)*N$, as shown in FIG. 1. Thus, the clients 20(1)-20(c) may be considered as a plurality of destination wireless communication devices with respect to respect ones of a plurality of spatial streams to be simultaneously transmitted by the AP 10.

Figure 2:
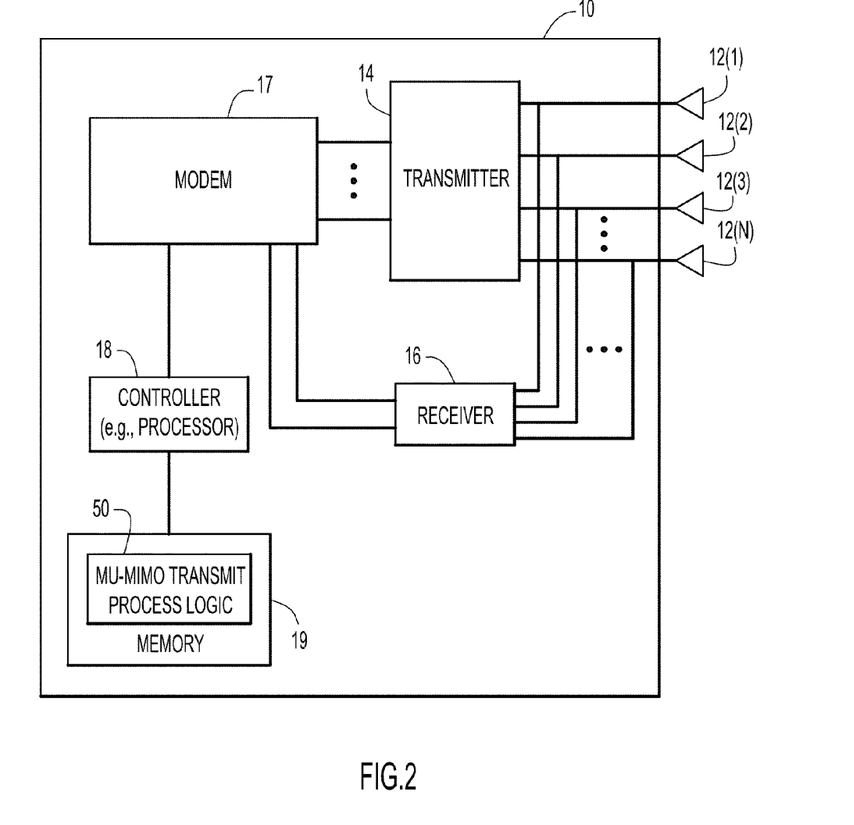
FIG. 2 is an example block diagram of the wireless communication device configured to generate a precoding matrix used for MU-MIMO transmissions.

FIG. 2 illustrates an example of a block diagram of the AP 10 that is configured to perform the MU-MIMO precoding techniques. As shown in FIG. 2, the AP 10 comprises a radio transmitter 14, a radio receiver 16, a modem 17, a controller 18 and a memory 19. The transmitter 14 upconverts antenna-specific baseband transmit signals (weighted from application of beamforming weight vectors) to corresponding ones of the plurality of antennas 12(1)-12(N) for transmission. The transmitter 14 may comprise individual transmitter circuits that supply respective upconverted signals to corresponding ones of a plurality of antennas 12(1)-12(N) for transmission. For simplicity, these individual transmitter circuits are not shown in FIG. 2.

The radio receiver 16 downconverts signals detected by the plurality of antennas 12(1)-12(N) and supplies antenna-specific receive signals to the modem 17. The receiver 16 may comprise a plurality of individual receiver circuits, each for a corresponding one of a plurality of antennas 12(1)-12(N) and which outputs a receive signal associated with a signal detected by a respective one of the plurality of antennas 12(1)-12(N). For simplicity, these individual receiver circuits are not shown. The controller 18 supplies data to the modem 17 to be transmitted and processes data recovered by the modem 17 from received signals. In addition, the controller 18 performs other transmit and receive control functionality. It should be understood that there are analog-to-digital converters (ADCs) and digital-to-analog converters (DACs) in the various signal paths to convert between analog and digital signals.

The memory 19 stores data used for the techniques described herein. The memory 19 may be separate or part of the controller 18. In addition, instructions for MU-MIMO process logic 50 may be stored in the memory 19 for execution by the controller 18. The controller 18 supplies the beamforming weights (vectors) to the modem 17 and the modem 17 applies the beamforming weights to signal streams to be transmitted to produce a plurality of weighted antenna-specific transmit signals that are upconverted by the transmitter 14 for transmission by corresponding ones of the plurality of antennas 12(1)-12(N).

The memory 19 is a memory device that may comprise read only memory (ROM), random access memory (RAM), magnetic disk storage media devices, optical storage media devices, flash memory devices, electrical, optical, or other physical/tangible (non-transitory) memory storage devices. The controller 18 is, for example, a microprocessor or microcontroller that executes instructions for the process logic 50 stored in memory 19. Thus, in general, the memory 19 may comprise one or more computer readable storage media (e.g., a memory device) encoded with software comprising computer executable instructions and when the software is executed (by the controller 18) it is operable (i.e., causes the controller 18) to perform the operations described herein in connection with process logic 50.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein (and/or to store software or processor instructions that are executed to carry out the computations described herein). Thus, the process logic 50 may be implemented with fixed logic (hardware) or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. Some or all of the controller functions described herein, such as those in connection with the process logic 50, may be implemented in the modem 17.

Figure 3:
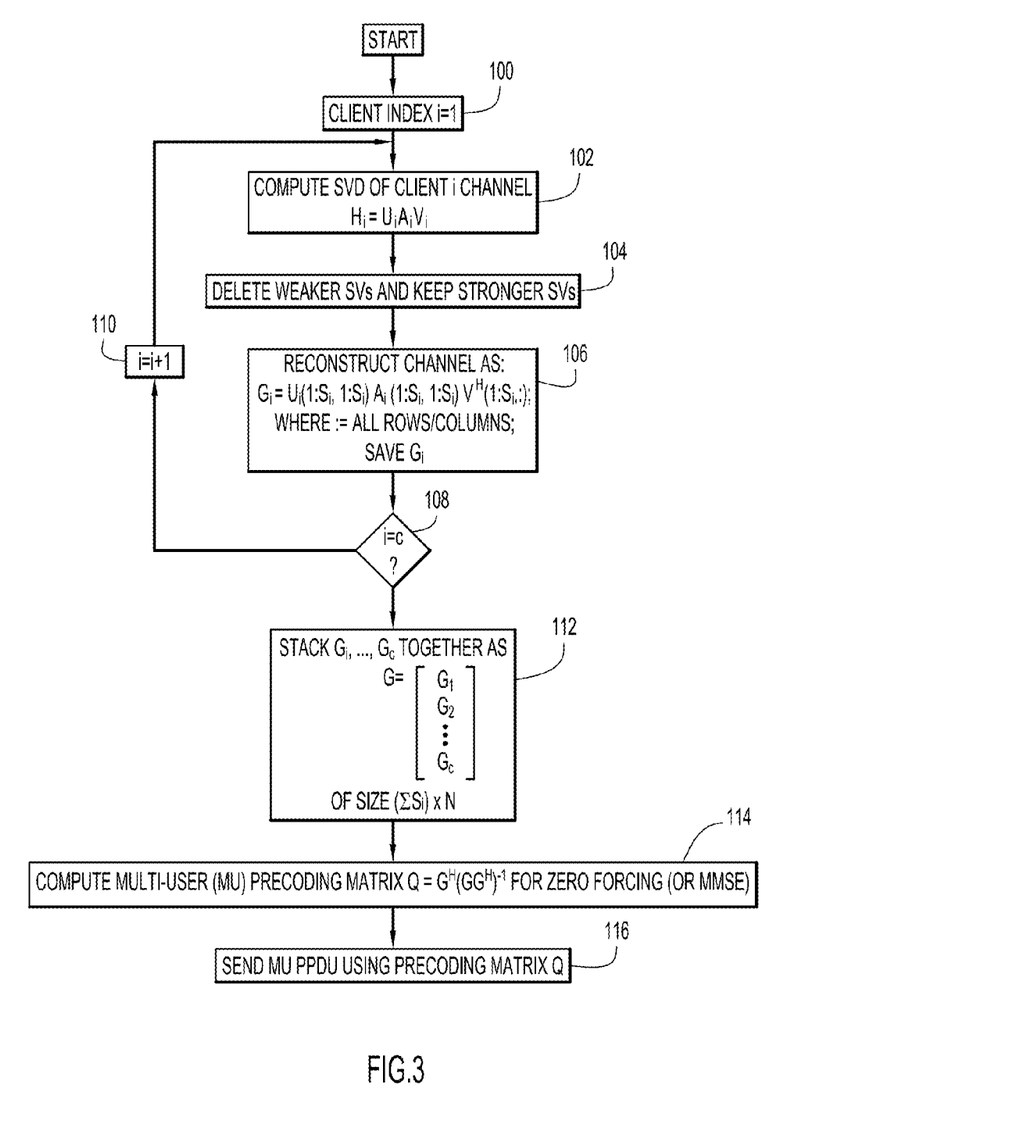
FIG. 3 is an example of a flow chart depicting operations for generating the precoding matrix used for MU-MIMO transmissions.
Figure 4:
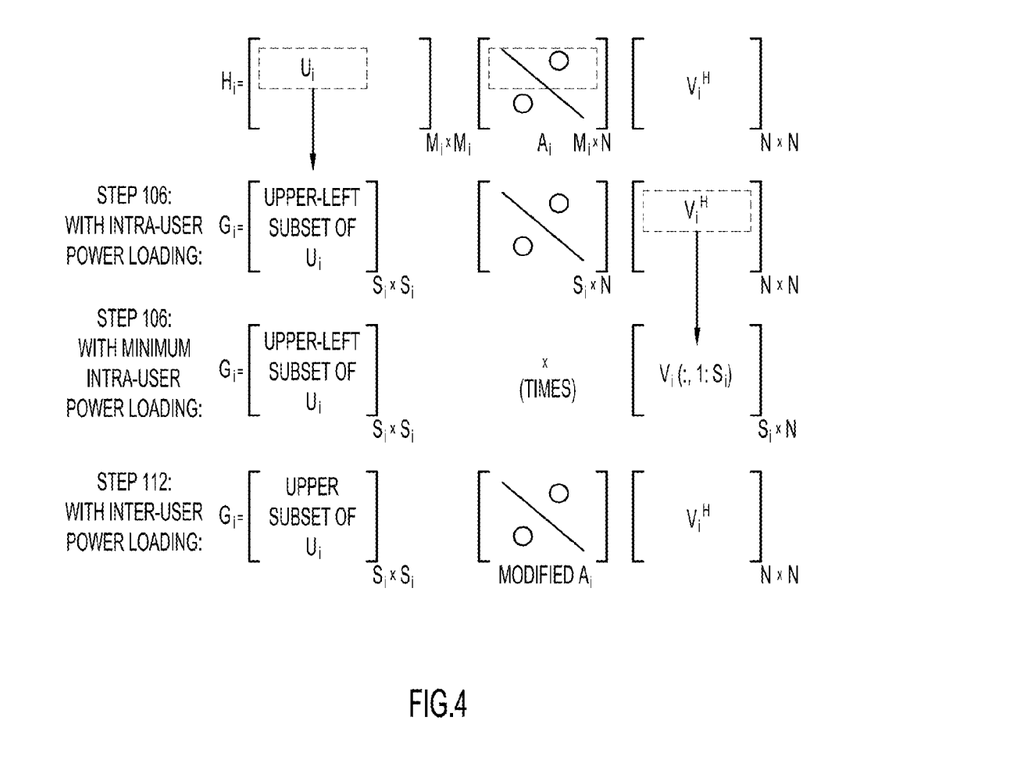
FIG. 4 is a diagram illustrating matrix computations/manipulations for operations depicted in FIG. 3.

Reference is now made to FIGS. 3 and 4 for a general description of the MU-MIMO precoding process that is performed when the MU-MIMO transmit process logic 50 (FIG. 2) is executed by the controller 18. The precoding process may be one of several operations performed when the controller 18 executes the MU-MIMO transmit process logic 50.

The precoding process is a two-stage process. First, single user (SU) singular value decomposition (SVD) beamforming is performed and singular values (SVs) are preserved/saved. Next, MU Zero Forcing (ZF)/Minimum Mean Square Error (MMSE) precoding is performed. A goal of the precoding process is to restrict the channel space for each recipient client (user) to the dominant modes. The SVD stage involves identifying eigenvectors for a particular client. Then, a MU-MIMO precoding matrix is computed within the eigenvector subspace to isolate each client's spatial stream to the intended destination client and to put nulls at all other clients for that respective spatial stream.

At 100, a client index i is initialized to 1. At 102, an SVD computation is made for client i from the client-specific channel matrix $H_i=U_i*A_i*V_i^H$, where $U_i$ is unitary matrix, $A_i$ is a diagonal matrix and $^H$ denotes the Hermitian or conjugate transpose operator. $V_i^H$ is a unitary matrix. The diagonal entries of $A_i$ are the SVs from the SVD computation. At 104, weaker SVs are deleted and the $S_i$ strongest SVs/singular vectors (Svecs) are saved/kept for each client. That is, a number of the strongest singular values and their corresponding singular vectors are from the SVD of each of the client-specific channel matrices, are stored at 104. At 106, a "principal component"-like single-client (i.e., single-user) channel matrix $G_i$ is computed as $G_i=U_i(1:S_i,1:Si)*A_i(1:S_i,:)*V_i^H$ where $^H$ denotes the Hermitian operation and the notation Z(a:b,c:d) indicates the submatrix comprising the rows a to b inclusive and the columns c to d inclusive of Z (this notation is used in the figures as well). $G_i$ is size $S_i*N$, where $S_i$ is the number of strongest SVs/Svecs maintained.

With reference to FIG. 4, there are several options for intra-user power loading that may be performed at 106 by way of selection of values for the $A_i$ matrices. Intra-user power loading involves allocating power to modes of the principal component-like channel matrix for a client. If no power loading is to be performed, then $\bar{A}_i$ (Abar) is set equal to the identity matrix I. If intra-user (intra-client) power loading is to be performed, then $\bar{A}_i$ is set equal to some function of the diagonal matrix $A_i$ as shown in FIG. 4. In one embodiment, Abar=A thereby putting more power on spatial modes with better strength. In an alternate embodiment Abar=inv (A), thereby delivering equal power across spatial streams at the receiver. In summary, values are set for a diagonal matrix used in computing the principal component-like single-client channel matrix so as to load power in modes (eigenmodes) of the principal component-like single-client channel matrix for a given client in a desired or predetermined manner. The values may be set to allocate more (or less) power for stronger modes than weaker modes. The diagonal matrix may be eliminated when computing the principal component-like single-client matrix so that power is equally distributed across the modes for a given client.

Referring back to FIG. 3, at 108, the current value of index i is compared with c, the number of clients. When the client index i is not equal to c (or less than c), then at 110, index i is incremented. When index i is equal to (or greater than) c, then at 112, the single-client channel matrices $G_i$ (for i=1 to c) are stacked (combined) together to form one "super" or principal component-like multi-user (i.e., multi-client) channel matrix G of size $(S_1+S_2+\ldots Sc)*N$. When stacking the matrices $G_i$, inter-user power loading may be employed. As shown in FIG. 4, a modified diagonal matrix is used to impose inter-user power loading, e.g., to borrow from strong channels and give to weaker channels a bump up (boost) if power is desired for higher order modulations/constellations, etc. Thus, values of the diagonal matrix may be set to impose inter-user power loading so as to borrow power from stronger modes and allocate power to weaker modes across the plurality of clients.

At 114, a MU-MIMO precoding (precoder) matrix Q is computed as $G^H(GG^H)^{-1}$ from the multi-user channel matrix G for ZF (or $G^H(GG^H+\sigma_n^2 I)^{-1}$ for MMSE). At 116, a MU data unit (including each of the multiple spatial streams), e.g., Protocol Data Unit (PPDU), is transmitted using the precoding MU-MIMO precoding matrix Q. The precoding matrix Q is size $N*(S_1+S_2+\ldots S_c)$. Thus, the precoding matrix Q is built from the proper matrix for each client (through construction of the multi-user channel matrix G) to thereby restrict the space to which precoding is applied, and then the precoding is applied using any now known or hereinafter developed precoding technique, e.g., ZF or MMSE.

Figure 5:
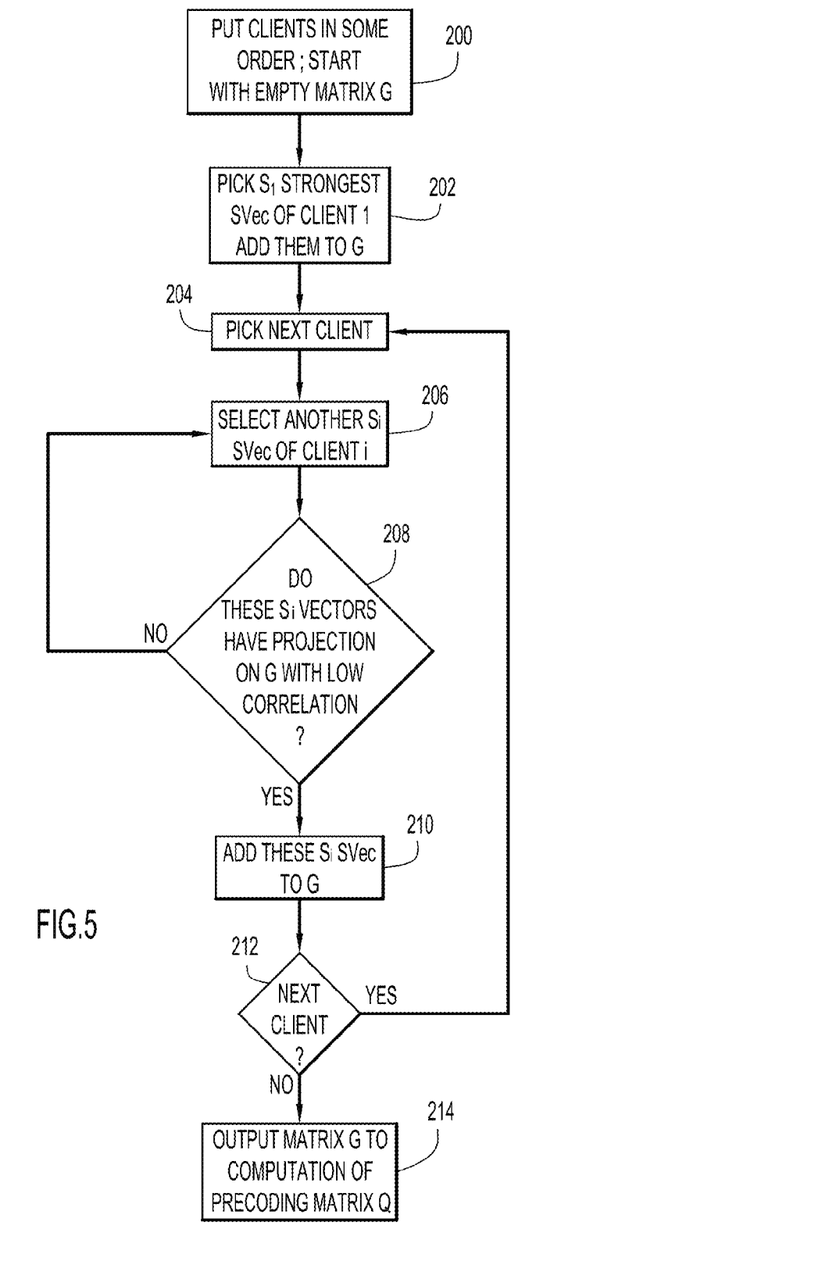
FIG. 5 is a flow chart illustrating a variation to the flow chart of FIG. 3 to account for inter-client correlation.

Reference is now made to FIG. 5 that depicts a variation to the processing depicted in FIGS. 3 and 4 to account for inter-client correlation. Assuming that inter-user correlation is relatively small (as is usually the case), the two-stage precoding methodology described above does not take into account inter-user correlation. For instance, a beam may not make it to $G_i$ based on the channel conditions indicates by the ratio of the strongest to weakest SV, but considering its lower correlation to other users' beams, it might be a better choice to be selected for $G_i$. Consequently, a further iteration (after a correlation check) per subcarrier can improve performance. This is referred to herein as a "projection algorithm" and is depicted in FIG. 5.

At 200, the clients within a downlink (DL)-MU group are arranged in some order based on a channel-quality or priority metric, or if no such metric exists then they are put in a random order. At 202, the $S_1$ strongest singular vectors (Svecs) of client 1 are selected and added to the multi-user channel matrix G. At 204, the next client is selected. At 206, another $S_i$ Svec is selected for client i. Initially the set of strongest $S_i$ Svecs are selected, unless they do not pass the projection test at 208 in which case another set of $S_i$ Svec is selected.

At 208, it is determined whether the $S_i$ vector has a projection on the multi-user channel matrix G with "low" correlation. For example, for a simple case of one spatial stream $S_1=S_2=,\ldots S_c=1$, one metric involves evaluating the orthogonal part of Svec on the multi-user channel matrix G and comparing it with a first power threshold (PT1). Another metric may involve evaluating the orthogonal part of Svec multiplied by an absolute value of its corresponding SV and comparing the result with a second power threshold (PT2). For a more general case of multiple different spatial streams, one metric may be to compare a statistical measure of the values of the orthogonal component of the $S_i$ Svec with the first power threshold or the orthogonal component of a statistical measure of the values of the $S_i$ Svec with the first power threshold, where the statistical measure is, for instance, mean or minimum. Similarly, another metric may be to select the orthogonal parts of the "top" $S_i$ Svecs multiplied by an absolute value of their corresponding SVs and comparing the results with the second power threshold.

Operations 206 and 208 are performed until a positive determination is made in 208, or if no set of $S_i$ Svec of that particular client passes the correlation test, then the best $S_i$ Svec set is selected, the one with minimum correlation value. Alternatively, the AP can take a note of such event and store information indicating that client as a highly correlated client with the other clients. At 210, the $S_i$ Svecs determined in operations 206 and 208 are added to the matrix G. At 212 it is determined whether the operations 206 and 208 have been performed for all clients, and if not, these operations are repeated. When it is determined that operations 206 and 208 have been performed for all clients, then at 214, the multi-user channel matrix G is output to the operation in which the precoding matrix is computed, e.g., operation 114 in FIG. 3.

The procedures depicted in FIG. 5 are performed for each subcarrier, or for a group of subcarriers which fall within the common coherence bandwidth of all clients within the DL-MU group.

In summary, consider first the simple case of one spatial stream per client. The strongest SV of the first client is selected. Then the strongest Svec of the second/next client is projected on the space spanned by the previously selected Svecs, and only the orthogonal component is kept. The choice of which Svec of the second/next client to be used may be based on one of the following metrics: the first Svec whose "orthogonal component power" that exceeds a first power threshold, or the Svec with maximum value of its "orthogonal component power" multiplied by the absolute value of its SV that exceeds a second power threshold. If with either of above metrics none of Svecs of the second/next user passes the corresponding power threshold, then the Svec giving the maximum value is used, and this event is counted for later re-examining the inclusion of that particular user within the DL-MU group. The power thresholds PT1 and PT2 are set to avoid beams that are too correlated to previously selected beams.

Next, consider the case of multiple-streams per user. For the first user, the $S_i$ strongest Svecs are picked. For the second/next user, the SVs are projected to the space spanned by the previously selected Svecs (of other users), and the component of the SV that is orthogonal to this space is picked. Those SVs whose orthogonal component satisfies one of the desired first and second metrics described above continue to participate in this process. Again, the first and second metrics for the general case can be stated as follows. The first metric involves the $S_i$ Svecs whose orthogonal component (all or majority of which) exceed the first power threshold, and the second metric involves the top $S_i$ Svecs that maximize "orthogonal component power" multiplied by the absolute value of the SV exceeding the second power threshold.

If fewer than $S_i$ Svecs exceed the power thresholds PT1 or PT2, this event is counted for later re-examination of the number of streams that a user can support and/or the inclusion of that particular user within the DL-MU group.

The above description of FIG. 5 assumes no power loading. To apply power loading, each SV is weighted. For example, each Svec is weighted with its corresponding singular value. Another possibility is to weight each Svec with its corresponding singular value normalized to the sum of the singular values of all participating Svecs in the final beam selection (included in the multi-user channel matrix G).

Figure 6A:
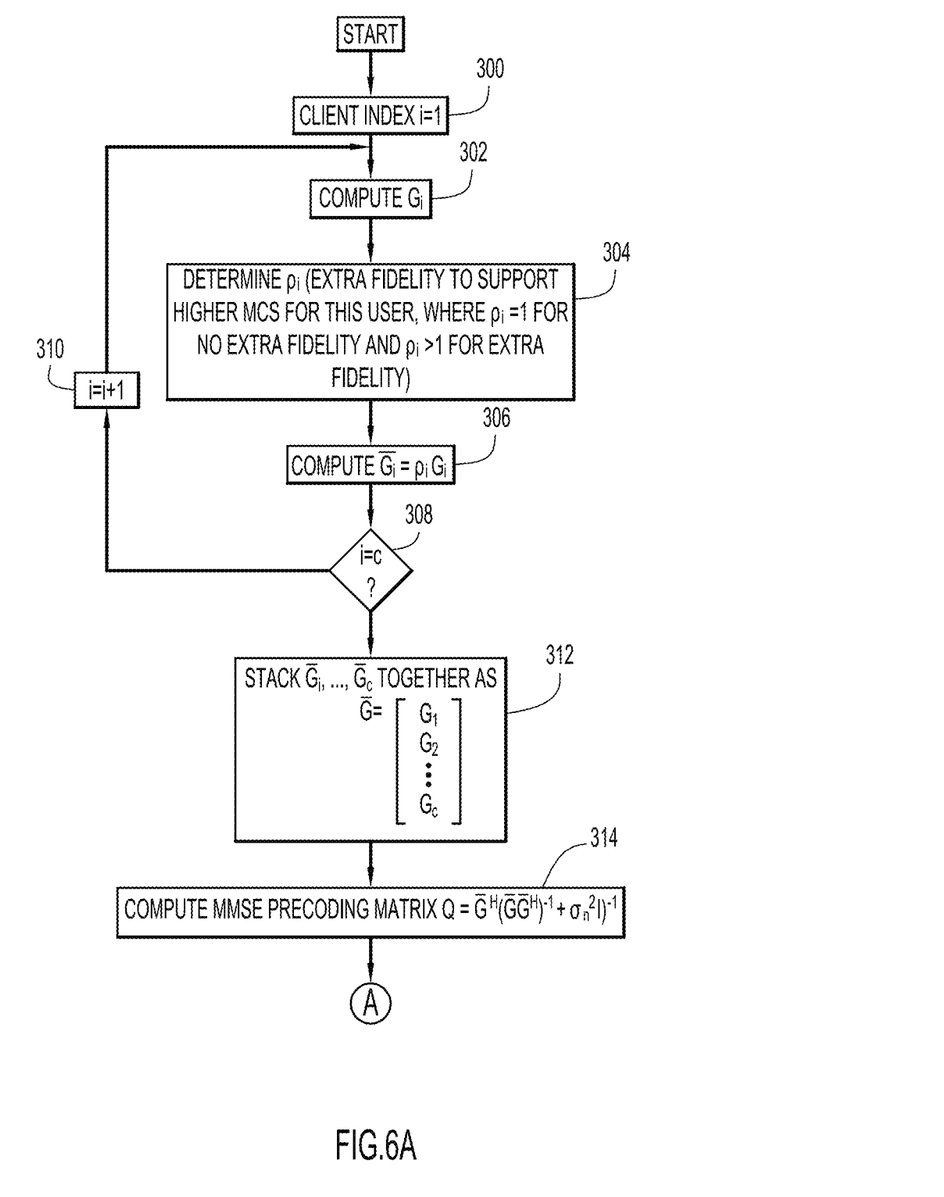
FIGS. 6A and 6B depict a flow chart for power balancing operations performed based on order of modulation/coding scheme employed.
Figure 6B:
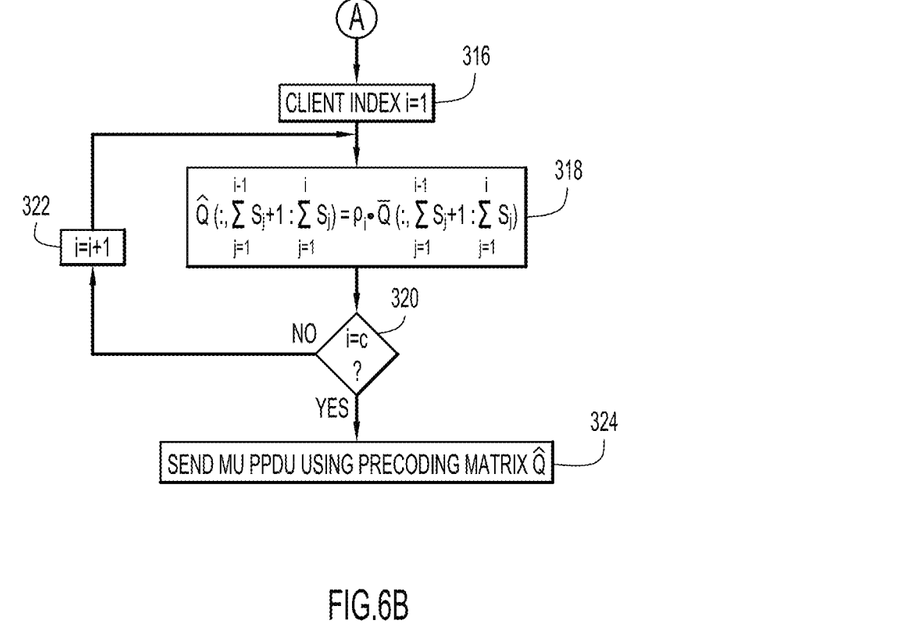

Reference is now made to FIGS. 6A and 6B for a description of a further variation that includes power balancing. MMSE precoding performs power loading so that all spatial streams are allocated very similar power at the intended recipient. However, near/far recipients and/or different modulation/coding schemes (MCSs) have different SINR requirements. Assuming this is interference limited, near/far recipients are less important than adapting to the MCS.

Thus, the techniques depicted in FIGS. 3 and 4 can be modified to account for the MCS employed. Beginning with reference to FIG. 6A, at 300, the client index is initialized. At 302, the matrix $G_i$ is computed (as in the computations of steps 102, 104 and 106 described above in connection with FIG. 4). At 304, a fidelity factor $\rho_i$ is determined to account for higher MCS for client i, where $\rho_i=1$ for no extra fidelity and $\rho_i>1$ for extra fidelity (higher order MCSs). Thus, the value of $\rho_i$ depends on the order of MCS for a given client i. At 306, the matrix $G_i$ for client i is scaled by $\rho_i$ to produce a modified matrix $\overline{G}_i$. As indicated at 308 and 310, this process is repeated for all clients and then at 312, the $\overline{G}_i$'s are stacked together to form the modified multi-user channel matrix $\overline{G}$. At 314, the MMSE precoding matrix $\overline{Q}$ is computed as $\overline{G}^H (\overline{G} \overline{G}^H + \sigma_n^2 I)^{-1}$, where $\sigma_n^2$ is a noise variance for an MMSE precoder and I is the identity matrix.

Next, operations 316-322 in FIG. 6B are performed to re-normalize the precoding matrix $\overline{Q}$ for each client. At 316, the client index i is initialized. For each client, operation 318 is performed to compute a re-normalized precoder matrix $\hat{Q}$ by scaling the columns for client i of the computed precoder matrix $\overline{Q}$ by $\rho_i$ in order to provide different levels of fidelity for each client. A higher value for $\rho_i$ means the precoding for client i can be more accurate. At 324, a MU data unit is sent using the re-normalized precoder matrix $\hat{Q}$.

Accounting for Inter-User Correlation—Selecting Relatively Orthogonal Clients for MU-MIMO Transmission Some recipients (clients) may happen to have very correlated channels and should not be recipients of the same DL-MU-MIMO transmission. This is not particularly common due to rich indoor multipath and typical spatial separations, but it is possible. Therefore, the AP may be configured to address inter-user correlation before constructing a DL-MU-MIMO transmission.

Inter-user correlation can be measured using the projection of each row from $G_i$ onto each row of $G_j$ for user i=/=(not equal to) user j, summed across subcarriers. If the summed projection exceeds a threshold, the AP disallows that combination of recipients until the AP receives a new channel estimate or for some (relatively long) time period. The inter-client/inter-user test may be performed either immediately when new channel estimates are available, when the relatively long period of time has expired (proactively) or immediately before a candidate DL-MU-MIMO transmission is being considered for transmission (just-in-time).

Figure 7:
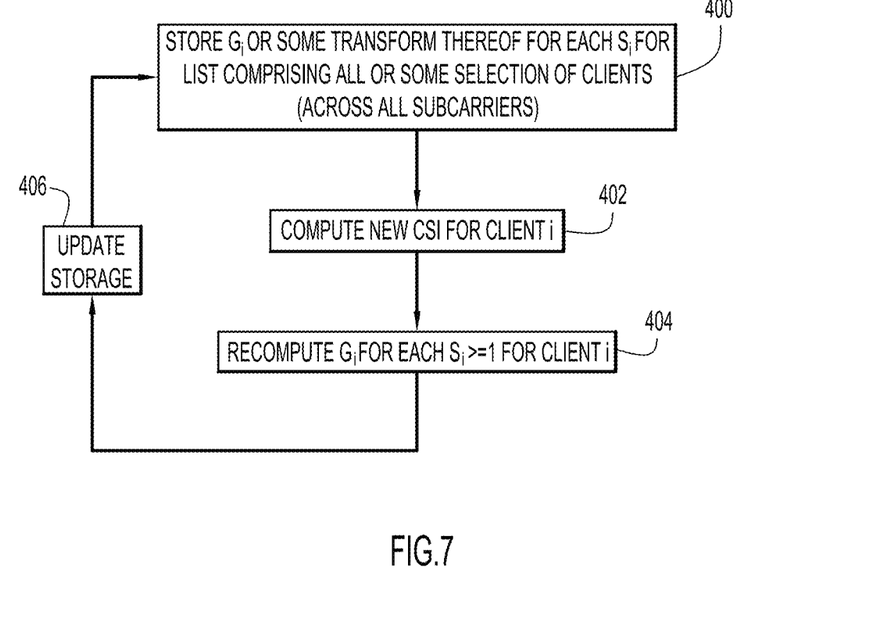
FIGS. 7-9 illustrate flow charts for operations performed to determine appropriate inclusion of a client device in a MU-MIMO group based on correlation among the client devices.
Figure 8:
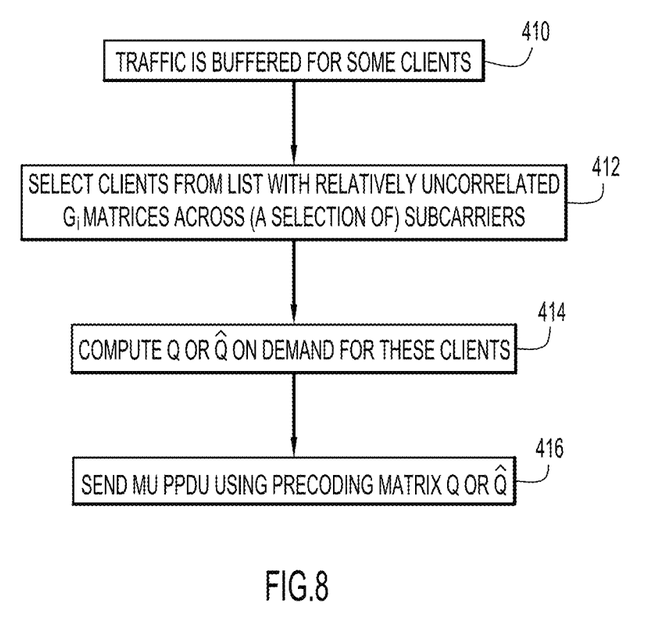

FIGS. 7 and 8 illustrate flow charts for this process. In FIG. 7, at 400, the matrix $G_i$ or some transform thereof is stored for all or a selection of clients (for all subcarriers). At 402, new channel state information (CSI), if available, is computed for client i. At 404, the matrix $G_i$ is recomputed for each $S_i >= 1$ for client i, and at 406, the stored information (for $G_i$ or some transform thereof) is updated.

Turning to FIG. 8 (with continued reference to FIG. 7), traffic is buffered for some clients at 410. At 412, based on updated CSI data, clients are selected from the list (stored at 400 in FIG. 7) with relatively uncorrelated $G_i$ matrices across all or a selection of subcarriers. At 414, also based on updated CSI data, the precoder matrix Q or $\hat{Q}$ is computed on demand for the clients selected at 412. At 416, a MU data unit is transmitted using the precoder matrix Q or $\hat{Q}$.

Figure 9:
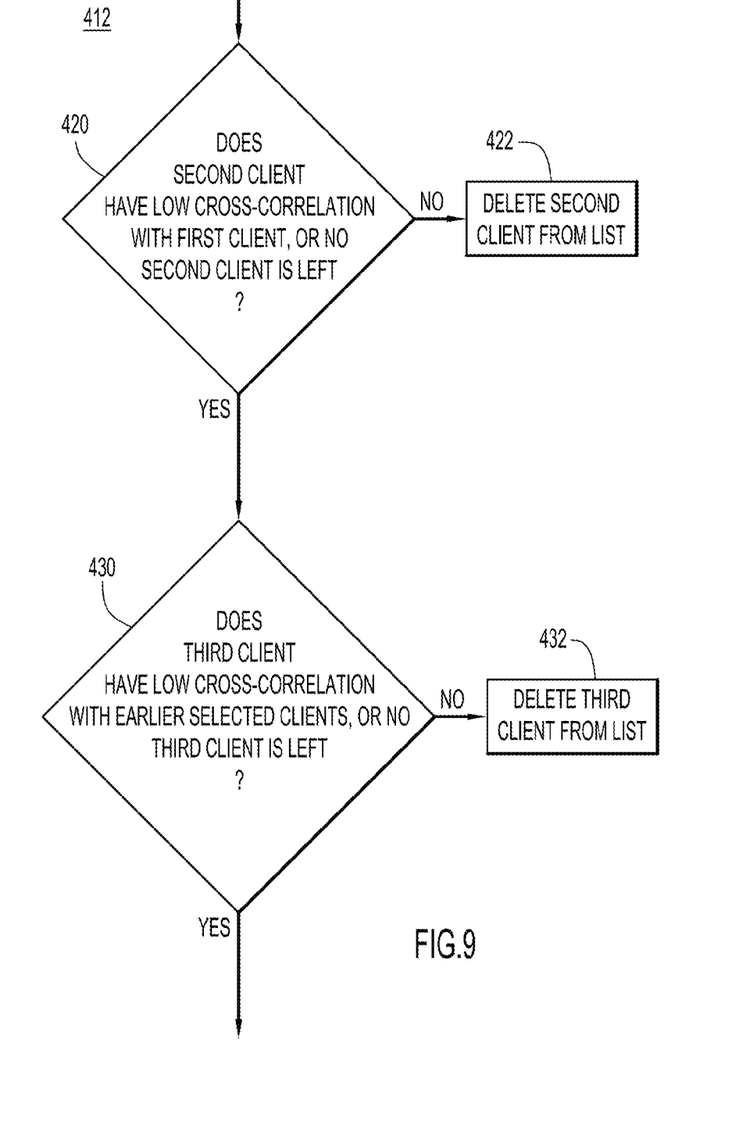

There are numerous ways of selecting clients in operation 412. FIG. 9 illustrates a flow chart for one example inter-client cross-correlation determination technique. At 420, a determination is made whether a second client has low cross-correlation with a first client, or whether there are no "second" clients left (in the MU group) for comparison. If a negative determination occurs at 420, then at 422, the second client is deleted from the list, and though not shown as such in FIG. 9, the process thereafter continues at 420. If a positive determination occurs at 420, then at 430, a determination is made whether a third client has low cross-correlation with earlier selected clients, or if no third client is left for comparison. If a negative determination occurs at 430, then at 432, the third client is deleted from the list and though not shown as such in FIG. 9, the process thereafter continues at 430. When a positive determination occurs at 430, then the process is complete and the clients in the list are used for further processing as described above in connection with FIGS. 7 and 8.

Performing the inter-client cross-correlation test each time channel estimates are available has $O(C^2)$ complexity, where C is the number of clients in a BSS. Assuming lower inter-recipient correlation, as is the typical case, performing the inter-client cross-correlation test has $O(r^2)$ complexity where $r<=4$ and is the number of clients in the DL-MU-MIMO transmission. In the rare cases in which recipient channels have strong cross-correlation, an exhaustive search for partners for one client still involves $O(C^2)$ complexity.

The pairwise inter-client cross-correlation test may involve storage of a C×C matrix representing "MU allowed/disallowed" with respect to a group of clients. When the AP is about to transmit a frame to a recipient, the AP looks along the row of the C×C matrix to discover other uncorrelated recipients, and, if packets are buffered for those recipients, the AP selects frames for up to 3 other recipients and sends them within a DL-MU-MIMO transmission.

A refinement is to divide the recipients into different, disjoint groups so that recipients in the same group all have pairwise channel correlations less than a certain threshold. A new recipient, or an existing recipient with updated CSI, is compared against each member of the group before being admitted to the group. One failed test against a group member means that other tests against other group members can be dispensed with. In still a further variation, the groups need not be disjoint (i.e., a recipient may participate in multiple groups). In some sense, this is a sparse version of the C×C matrix, where each row of the C×C matrix is a different group containing multiple recipients.

It should be understood by those with ordinary skill in the art that the computations associated with the techniques described herein are performed across all subcarriers.

In summary, a method, an apparatus and computer readable storage media are provided embodying the techniques described herein. The method involves, at a first wireless communication device having a plurality of antennas from which multiple spatial streams are to be simultaneously transmitted to a plurality of second wireless communication devices each having a plurality of antennas, computing a channel matrix between the plurality of antennas of the first wireless communication device and the plurality of antennas of each of the second wireless communication devices to produce a plurality of client-specific channel matrices; computing a singular value decomposition of each of the client-specific channel matrices; storing a number of strongest singular values and their corresponding singular vectors from the singular decomposition of each of the client-specific channel matrices; from each client-specific channel matrix, computing a principal component-like single-client channel matrix based on the number of strongest singular values stored; combining together the principal component-like single-client channel matrices to form a principal component-like multi-user channel matrix; computing a precoding matrix from the principal component-like multi-user channel matrix; and applying the precoding matrix to the multiple spatial streams to be simultaneously transmitted across the plurality of antennas of the first wireless communication device.

The apparatus comprises a plurality of antennas, a receiver coupled to the plurality of antennas to generate antenna-specific receive signals from signals detected by the plurality of antennas; a transmitter coupled to the plurality of antennas to supply antenna-specific transmit signals for transmission via respective ones of the plurality of antennas, and a controller coupled to the transmitter and the receiver. The controller is configured to compute a channel matrix between the plurality of antennas and a plurality of antennas of each of a plurality of destination wireless communication devices to produce a plurality of client-specific channel matrices; compute a singular value decomposition of each of the client-specific channel matrices; store a number of strongest singular values and their corresponding singular vectors from the singular decomposition of each of the client-specific channel matrices; compute a principal component-like single-client channel matrix from each client-specific channel matrix based on the number of strongest singular values stored; combine together the principal component-like single-client channel matrices to form a principal component-like multi-user channel matrix; compute a precoding matrix from the principal component-like multi-user channel matrix; and apply the precoding matrix to multiple spatial streams which are supplied to the transmitter, after application of the precoding matrix, for simultaneous transmission across the plurality of antennas.

Similarly, one or more computer readable storage media are provided, wherein the computer readable storage media are encoded with software comprising computer executable instructions and when the software is executed by a processor, it is operable to compute a channel matrix between a plurality of antennas of a first wireless communication device and a plurality of antennas of each of a plurality of second wireless communication devices to produce a plurality of client-specific channel matrices; compute a singular value decomposition of each of the client-specific channel matrices; store a number of strongest singular values and their corresponding singular vectors from the singular decomposition of each of the client-specific channel matrices; from each client-specific channel matrix, compute a principal component-like single-client channel matrix based on the number of strongest singular values stored; combine together the principal component-like single-client channel matrices to form a principal component-like multi-user channel matrix; compute a precoding matrix from the principal component-like multi-user channel matrix; and apply the precoding matrix to multiple spatial streams to be simultaneously transmitted across the plurality of antennas of the first wireless communication device to the plurality of second wireless communication devices.

The above description is intended by way of example only.

What is claimed is:

1. A method comprising:
at a first wireless communication device having a plurality of antennas from which multiple spatial streams are to be simultaneously transmitted to a plurality of second wireless communication devices each having a plurality of antennas, computing a channel matrix between the plurality of antennas of the first wireless communication device and the plurality of antennas of each of the second wireless communication devices to produce a plurality of client-specific channel matrices;
computing a singular value decomposition of each of the client-specific channel matrices;
storing a number of strongest singular values and their corresponding singular vectors from the singular decomposition of each of the client-specific channel matrices;
from each client-specific channel matrix, computing a principal component-like single-client channel matrix based on the number of strongest singular values stored;
combining together the principal component-like single-client channel matrices to form a principal component-like multi-user channel matrix;
computing a precoding matrix from the principal component-like multi-user channel matrix; and
applying the precoding matrix to the multiple spatial streams to be simultaneously transmitted across the plurality of antennas of the first wireless communication device.

2. The method of claim 1, wherein computing the principal component-like single-client channel matrix for one or more second wireless communication devices comprises setting values for a diagonal matrix used in computing the principal component-like single-client channel matrix to load power in modes of the principal component-like single-client channel matrix.

3. The method of claim 2, wherein setting values comprises setting values to allocate more or less power for stronger modes than weaker modes.

4. The method of claim 2, wherein computing the principal component-like single-client channel matrix comprises eliminating the diagonal matrix otherwise used in computing the principal component-like single-client channel matrix so that power is equally distributed across the modes.

5. The method of claim 2, wherein setting values comprises setting values to impose inter-user power loading so as to borrow power from stronger modes and allocate power to weaker modes across the plurality of second wireless communication devices.

6. The method of claim 1, wherein combining the principal component-like single-client channel matrices to form the principal component-like multi-user channel matrix comprises:
for a particular one of the plurality of second wireless communication devices, selecting one or more strongest singular vectors from its principal component-like single-client channel matrix to be included in the principal component-like multi-user channel matrix;
for each of the plurality of other second wireless communication devices:
selecting one or more strongest singular vectors from its channel matrix;
determining a measure of correlation of the selected one or more singular vectors on the principal component-like multi-user channel matrix; and adding the selected one or more singular vectors to the principal component-like multi-user channel matrix if its associated measure of correlation is less than a threshold.

7. The method of claim 6, wherein determining a measure of correlation comprises comparing an orthogonal part of the selected one or more singular vectors on the principal component-like multi-user channel matrix with a threshold, and adding comprises adding the selected one or more singular vectors to the principal component-like multi-user channel matrix when the orthogonal part of the respective selected one or more singular vectors on the principal component-like multi-user channel matrix exceeds the threshold.

8. The method of claim 6, wherein determining a measure of correlation comprises comparing a product resulting from an orthogonal part of the selected one or more singular vectors on the principal component-like multi-user channel matrix multiplied by an absolute value of the corresponding singular value of the selected one or more singular vectors with a threshold, and adding comprises adding the selected one or more singular vectors to the principal component-like multi-user channel matrix when the product exceeds the threshold.

9. The method of claim 7, and further comprising weighting each selected one or more singular vectors with one of its corresponding singular value and its corresponding singular value normalized to a sum of the singular values for all singular vectors included in the principal component-like multi-user channel matrix.

10. The method of claim 1, further comprising multiplying the principal component-like single-client channel matrix for each of the plurality of second wireless communication devices with a fidelity factor whose value depends on an order of a modulation/coding scheme for the corresponding second wireless communication device, to produce a modified principal component-like single-client channel matrix, and wherein combining comprises combining the modified principal component-like single-client channel matrices to produce the principal component-like multi-user channel matrix.

11. The method of claim 10, further comprising re-normalizing the precoding matrix by scaling columns of the precoding matrix for a given second wireless communication device by the fidelity factor for the second wireless communication device.

12. The method of claim 1, further comprising computing a measure of inter-user correlation among the plurality of second wireless communication devices based on the principal component-like channel matrices of respective second wireless communication devices, and disallowing inclusion of second wireless communication devices in a multi-user group when their measure of inter-user correlation exceeds a threshold.

13. The method of claim 12, wherein computing the measure of inter-user correlation comprises computing a projection of each row of the principal component-like single-client channel matrix for one of the second wireless communication devices with each row of the principal component-like single-client channel matrix for each of the other second wireless communication devices.

14. The method of claim 12, further comprising repeating the computing of the measure of inter-user correlation when new channel estimate information is received, after expiration of a time period or immediately prior to processing of a transmission to multiple second wireless communication devices.

15. The method of claim 1, and further comprising storing data that divides the plurality of second wireless communication devices into different disjoint groups such that second wireless communication devices in the same group all have pairwise channel correlations less than a threshold.

16. An apparatus comprising:
a plurality of antennas;
a receiver coupled to the plurality of antennas to generate antenna-specific receive signals from signals detected by the plurality of antennas;
a transmitter coupled to the plurality of antennas to supply antenna-specific transmit signals for transmission via respective ones of the plurality of antennas;
a controller coupled to the transmitter and the receiver, wherein the controller is configured to:
compute a channel matrix between the plurality of antennas and a plurality of antennas of each of a plurality of destination wireless communication devices to produce a plurality of client-specific channel matrices;
compute a singular value decomposition of each of the client-specific channel matrices;
store a number of strongest singular values and their corresponding singular vectors from the singular decomposition of each of the client-specific channel matrices;
compute a principal component-like single-client channel matrix from each client-specific channel matrix based on the number of strongest singular values stored;
combine together the principal component-like single-client channel matrices to form a principal component-like multi-user channel matrix;
compute a precoding matrix from the principal component-like multi-user channel matrix; and
apply the precoding matrix to multiple spatial streams which are to be supplied to the transmitter, after application of the precoding matrix, for simultaneous transmission across the plurality of antennas.

17. The apparatus of claim 16, wherein the controller is configured to compute the principal component-like single-client channel matrix for one or more destination wireless communication devices by setting values for a diagonal matrix used in computing the principal component-like single-client channel matrix to load power in modes of the principal component-like single-client channel matrix.

18. The apparatus of claim 16, wherein the controller is configured to combine the principal component-like single-client channel matrices to form the principal component-like multi-user channel matrix by:
for a particular one of the plurality of destination wireless communication devices, selecting one or more strongest singular vectors from its principal component-like single-client channel matrix to be included in the principal component-like multi-user channel matrix;
for each of the plurality of other destination wireless communication devices:
select one or more strongest singular vectors from its principal component-like single-client channel matrix;
determine a measure of correlation of the selected one or more strongest singular vectors on the principal component-like multi-user channel matrix; and
add the selected one or more strongest singular vectors to the principal component-like multi-user channel matrix if its associated measure of correlation is less than a threshold.

19. The apparatus of claim 18, wherein the controller is configured to determine the measure of correlation by comparing an orthogonal part of the selected one or more strongest singular vectors on the principal component-like multi-user channel matrix with a threshold, and wherein the controller adds the selected one or more strongest singular vectors to the principal component-like multi-user channel matrix when the orthogonal part of the selected one or more strongest singular vectors on the principal component-like multi-user channel matrix exceeds the threshold.

20. The apparatus of claim 16, wherein the controller is further configured to multiply the principal component-like single-client channel matrix for each of the plurality of destination wireless communication devices with a fidelity factor whose value depends on an order of a modulation/coding scheme for the corresponding destination wireless communication device, to produce a modified principal component-like single-client channel matrix, and wherein the controller is configured to combine the modified principal component-like single-client channel matrices to produce the principal component-like multi-user channel matrix.

21. The apparatus of claim 16, wherein the controller is further configured to compute a measure of inter-user correlation among the plurality of destination wireless communication devices based on the principal component-like channel matrices of respective destination wireless communication devices, and disallow inclusion of destination wireless communication devices in a multi-user group when their measure of inter-user correlation exceeds a threshold.

22. A tangible computer readable storage device encoded with software comprising computer executable instructions and when the software is executed by a processor operable to:
   compute a channel matrix between a plurality of antennas of a first wireless communication device and a plurality of antennas of each of a plurality of second wireless communication devices to produce a plurality of client-specific channel matrices;
   compute a singular value decomposition of each of the client-specific channel matrices;
   store a number of strongest singular values and their corresponding singular vectors from the singular decomposition of each of the client-specific channel matrices;
   from each client-specific channel matrix, compute a principal component-like single-client channel matrix based on the number of strongest singular values stored;
   combine together the principal component-like single-client channel matrices to form a principal component-like multi-user channel matrix;
   compute a precoding matrix from the principal component-like multi-user channel client matrix; and
   apply the precoding matrix to multiple spatial streams to be simultaneously transmitted across the plurality of antennas of the first wireless communication device to the plurality of second wireless communication devices.

23. The tangible computer readable storage device of claim 22, wherein the instructions that are operable to combine the principal component-like single-client channel matrices to form the principal component-like multi-user channel matrix comprise instructions operable to:
   for a particular one of the plurality of second wireless communication devices, select one or more strongest singular vectors from its principal component-like single-client channel matrix to be included in the principal component-like multi-user channel matrix;
   for each of the plurality of other second wireless communication devices:
      select one or more strongest singular vectors from its principal component-like single-client channel matrix;
      determine a measure of correlation of the selected one or more strongest singular vectors on the principal component-like multi-user channel matrix; and
      add the selected one or more strongest singular vectors to the principal component-like multi-user channel matrix if the measure of correlation is less than a threshold.

24. The tangible computer readable storage device of claim 23, wherein the instructions that are operable to determine the measure of correlation comprise instructions operable to compare an orthogonal part of the selected one or more strongest singular vectors on the principal component-like multi-user channel matrix with a threshold, and further comprising instructions operable to add the selected one or more strongest singular vectors to the principal component-like multi-user channel matrix when the orthogonal part of the selected one or more strongest singular vectors on the principal component-like multi-user channel matrix exceeds the threshold.

25. The tangible computer readable storage device of claim 23, further comprising instructions operable to multiply the principal component-like single-client channel matrix for each of the plurality of second wireless communication devices with a fidelity factor whose value depends on an order of a modulation/coding scheme for the corresponding second wireless communication device, to produce a modified principal component-like single-client channel matrix, and combine the modified principal component-like single-client channel matrices to produce the principal component-like multi-user channel matrix.

* * * * *